United States Patent
Nguyen et al.

(10) Patent No.: US 7,496,747 B2
(45) Date of Patent: Feb. 24, 2009

(54) REDUNDANT LINK MEZZANINE DAUGHTER CARD

(75) Inventors: Thai Nguyen, Austin, TX (US); Sean Hart, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 482 days.

(21) Appl. No.: 11/282,178

(22) Filed: Nov. 18, 2005

(65) Prior Publication Data
US 2007/0118672 A1  May 24, 2007

(51) Int. Cl.
*G06F 13/00* (2006.01)
(52) U.S. Cl. .................................. 713/100; 710/104
(58) Field of Classification Search .............. 713/100, 713/1; 710/104
See application file for complete search history.

(56) References Cited

U.S. PATENT DOCUMENTS

| | | | |
|---|---|---|---|
| 5,805,841 A | 9/1998 | Klein | |
| 6,282,599 B1* | 8/2001 | Gallick et al. | 710/306 |
| 6,608,761 B2* | 8/2003 | Wachel | 361/785 |
| 7,219,183 B2* | 5/2007 | Pettey et al. | 710/316 |
| 2004/0039880 A1 | 2/2004 | Pentkovski et al. | |

OTHER PUBLICATIONS

Fruehe, "Planning Considerations For Multicore Processor Technology", Dell Power Solutions, May 2005, pp. 67-72, © 2005 Dell Inc.
Brewer, et al. "PCI Express Technology", a white paper published by Dell Inc., Feb. 2004, pp. 1-11, © 2005 Dell Inc.

\* cited by examiner

*Primary Examiner*—Thomas Lee
*Assistant Examiner*—Albert Wang
(74) *Attorney, Agent, or Firm*—Haynes and Boone, LLP

(57) ABSTRACT

A method and system for increasing flexibility, I/O accessibility, and reliability of multicore, multiprocessor architecture, a first input/output (I/O) controller and a second I/O controller are coupled by an I/O controller link card. The first I/O controller is coupled to at least one multicore processor. A plurality of primary I/O slots and a plurality of secondary I/O slots are respectively coupled to the first I/O controller and the second I/O controller. The I/O controller link card is removably insertable in adjacent slots spanning one of the primary I/O slots and one of the secondary I/O slots, thereby providing a flexible link to electrically couple the first I/O controller and the second I/O controller.

19 Claims, 4 Drawing Sheets

REDUNDANT LINK MEZZANINE DAUGHTER CARD

BACKGROUND

The present disclosure relates to the field of multiprocessor based architectures for information handling systems, and more particularly to improving flexibility and reliability of the architecture.

As the value and use of information continues to increase, individuals and businesses seek additional ways to acquire, process and store information. One option available to users is information handling systems. An information handling system ('IHS') generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, entertainment, and/or global communications. In addition, information handling systems may include a variety of hardware and software components that may be configured to process, store, and communicate information and may include one or more computer systems, data storage systems, and networking systems.

A traditional dual processor based computer system architecture generally includes two separate integrated circuit (IC) chips for the two processors. The processors may be located on the same mother board or may be located on separate printed circuit boards connected by a communication bus. A dual core processor based computer system architecture generally refers to a single IC chip that includes two independently operable processors or cores. The dual core processor may or may not share components such as cache memory within the same IC chip. A multicore processor architecture may be considered as an extension of the dual core processor. That is, the multicore processor architecture includes more than two processors or cores on a single IC chip. A multicore, multiprocessor architecture typically includes a plurality of multicore processors that co-operate to perform one or more predefined functions. The plurality of multicore processors are coupled to each other and to one or more I/O devices via one or more communication links.

Use of commercially available chipsets for memory controllers to control memory, and input/output (I/O) hub (IOH) to connect various I/O devices coupled to a single processor as well as multiprocessor systems is well known. However, such chipsets may not accommodate desired features of multicore, multiprocessor based computer system architecture such as flexibility, performance and reliability. For example, number of communication links available to each IOH and to other multicore processors may be limited and/or be factory configured. This may limit implementation of certain topologies configured for predefined applications such as improved performance/throughput and fault tolerant operation. As another example, a first device plugged in a PCIexpress (PCIe) card slot coupled to a first IOH may not be able to communicate with a second device plugged in another PCIe card slot coupled to a second IOH located within the same system without compromising the number of PCIe slots and/or reliability of the architecture.

Therefore, a need exists to increase flexibility and reliability of multicore, multiprocessor architecture based systems. More specifically, a need exists to develop tools and techniques for dynamically reconfiguring topology of multicore, multiprocessor architecture based systems to meet predefined objectives such as minimizing impact of a single component failure and facilitating inter component communication. Accordingly, it would be desirable to provide for reconfiguring topology of multicore, multiprocessors included in an IHS, absent the disadvantages found in the prior methods discussed above.

SUMMARY

The foregoing need is addressed by the teachings of the present disclosure, which relates to a system and method for improved flexibility and reliability of multicore, multiprocessor architectures. According to one embodiment, for increasing flexibility and reliability of multicore, multiprocessor architecture, a first input/output (I/O) controller and a second I/O controller are coupled by an I/O controller link card. The first I/O controller is coupled to at least one multicore processor. A plurality of primary I/O slots and a plurality of secondary I/O slots are respectively coupled to the first I/O controller and the second I/O controller. The I/O controller link card is removably insertable in adjacent slots spanning one of the primary I/O slots and one of the secondary I/O slots, thereby providing a flexible link to electrically couple the first I/O controller and the second I/O controller.

In one embodiment, a method for reconfiguring a link includes selecting a first predefined slot of a plurality of primary I/O slots and a second predefined slot of a plurality of secondary I/O slots. The first predefined slot and the second predefined slot are adjacently disposed to each other. A plurality of first connectors is inserted into a plurality of matching first connectors, the plurality of the matching first connectors being included in the first predefined slot. A plurality of second connectors is inserted into a plurality of matching second connectors, the plurality of the matching second connectors being included in the second predefined slot. The insertion of the plurality of first connectors and the plurality of second connectors establishes the link and removal of the plurality of first connectors and the plurality of second connectors de-establishes the link.

DETAILED DESCRIPTION

Use of commercially available chipsets for memory controllers to control memory, and input/output (I/O) hubs to connect to various I/O devices to a single processor as well as multiprocessor systems may not accommodate desired features of a multicore, multiprocessor based computer system architecture such as flexibility, I/O accessibility, performance and reliability. There is a need for improving the flexibility, I/O accessibility, and reliability of multicore processor based systems. According to one embodiment, for increasing flexibility, I/O accessibility, and reliability of multicore, multiprocessor architecture, includes a first input/output (I/O) controller and a second I/O controller are coupled by an I/O controller link card. The I/O controller link card is removably insertable in adjacent slots spanning one of the primary I/O slots and one of the secondary I/O slots, thereby providing a flexible, user modifiable link to electrically couple the first I/O controller and the second I/O controller.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, personal digital assistants, cellular phones, gaming consoles, a network storage device, or any other suitable device and may vary in size, shape, performance, functionality, and price. The information handling system may include random access memory (RAM), one or more processing resources such as central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to receive/transmit communications between the various hardware components.

Figure 1:
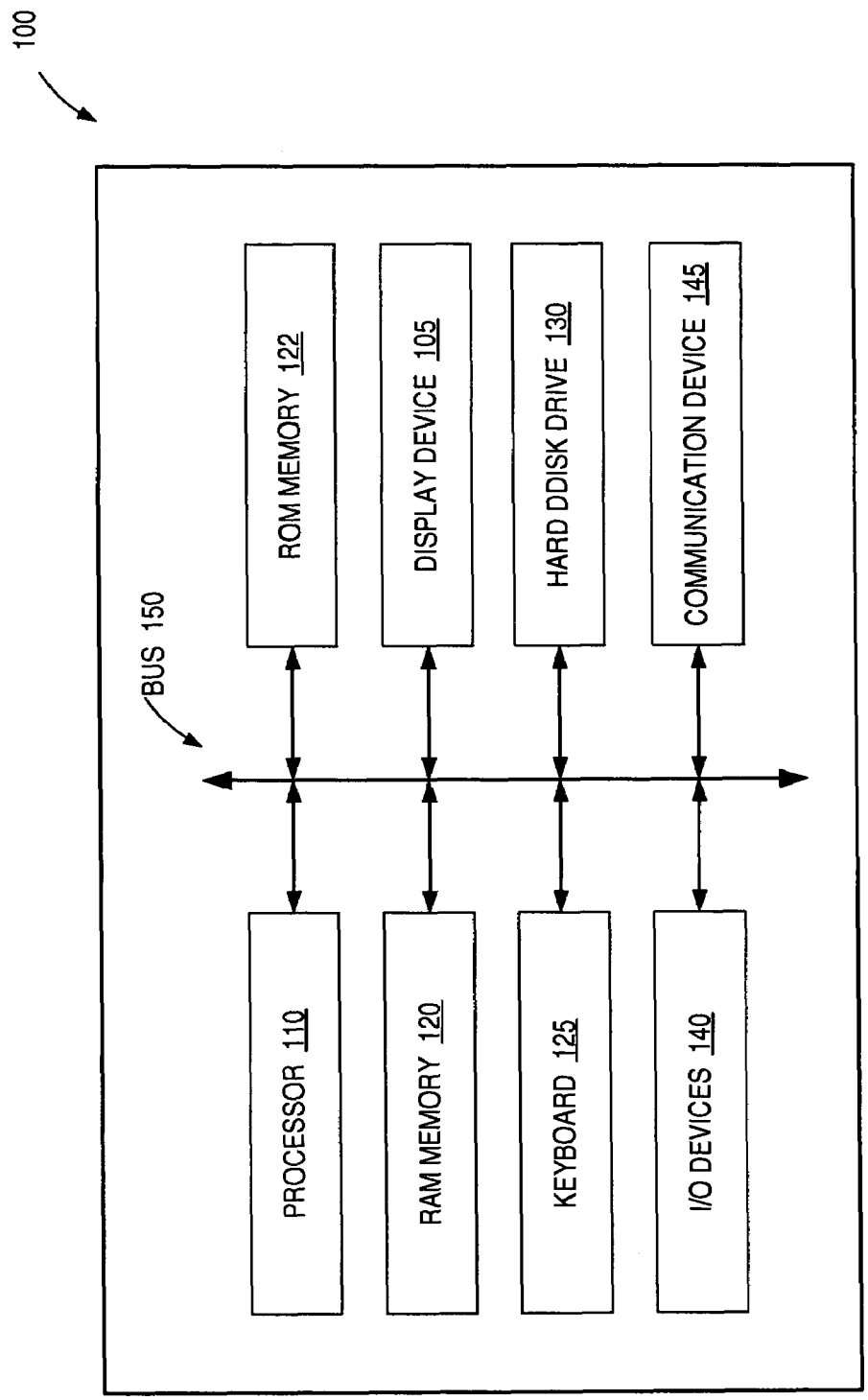
FIG. 1 illustrates a block diagram of an information handling system having an improved processor, according to an embodiment.

FIG. 1 illustrates a block diagram of an information handling system 100 having an improved processor, according to an embodiment. The information handling system 100 includes a processor 110, a system random access memory (RAM) 120 (also referred to as main memory), a non-volatile ROM 122 memory, a display device 105, a keyboard 125 and an I/O controller 140 for controlling various other input/output devices. For example, the I/O controller 140 may include a keyboard controller, a cursor device controller and/or the serial I/O controller. It should be understood that the term "information handling system" is intended to encompass any device having a processor that executes instructions from a memory medium.

The IHS 100 is shown to include a hard disk drive 130 connected to the processor 110, although some embodiments may not include the hard disk drive 130. In a particular embodiment, the IHS 100 may include additional hard disks. The processor 110 communicates with the system components via a bus 150, which includes data, address and control lines. In one embodiment, the IHS 100 may include multiple instances of the bus 150. A communications device 145, such as a network interface card and/or a radio device, may be connected to the bus 150 to enable wired and/or wireless information exchange between the IHS 100 and other devices (not shown).

In a particular embodiment, the processor 110 is a dual core processor. Additional detail of a topology for an information handling system having one or more multicore processors is described with reference to FIG. 2.

The processor 110 is operable to execute the computing instructions and/or operations of the IHS 100. The memory medium, e.g., RAM 120, preferably stores instructions (also known as a "software program") for implementing various embodiments of a method in accordance with the present disclosure. An operating system (OS) of the IHS 100 is a type of software program that controls execution of other software programs, referred to as application software programs. In various embodiments the instructions and/or software programs may be implemented in various ways, including procedure-based techniques, component-based techniques, and/or object-oriented techniques, among others. Specific examples include assembler, C, XML, C++ objects, Java and Microsoft Foundation Classes (MFC).

Figure 2:
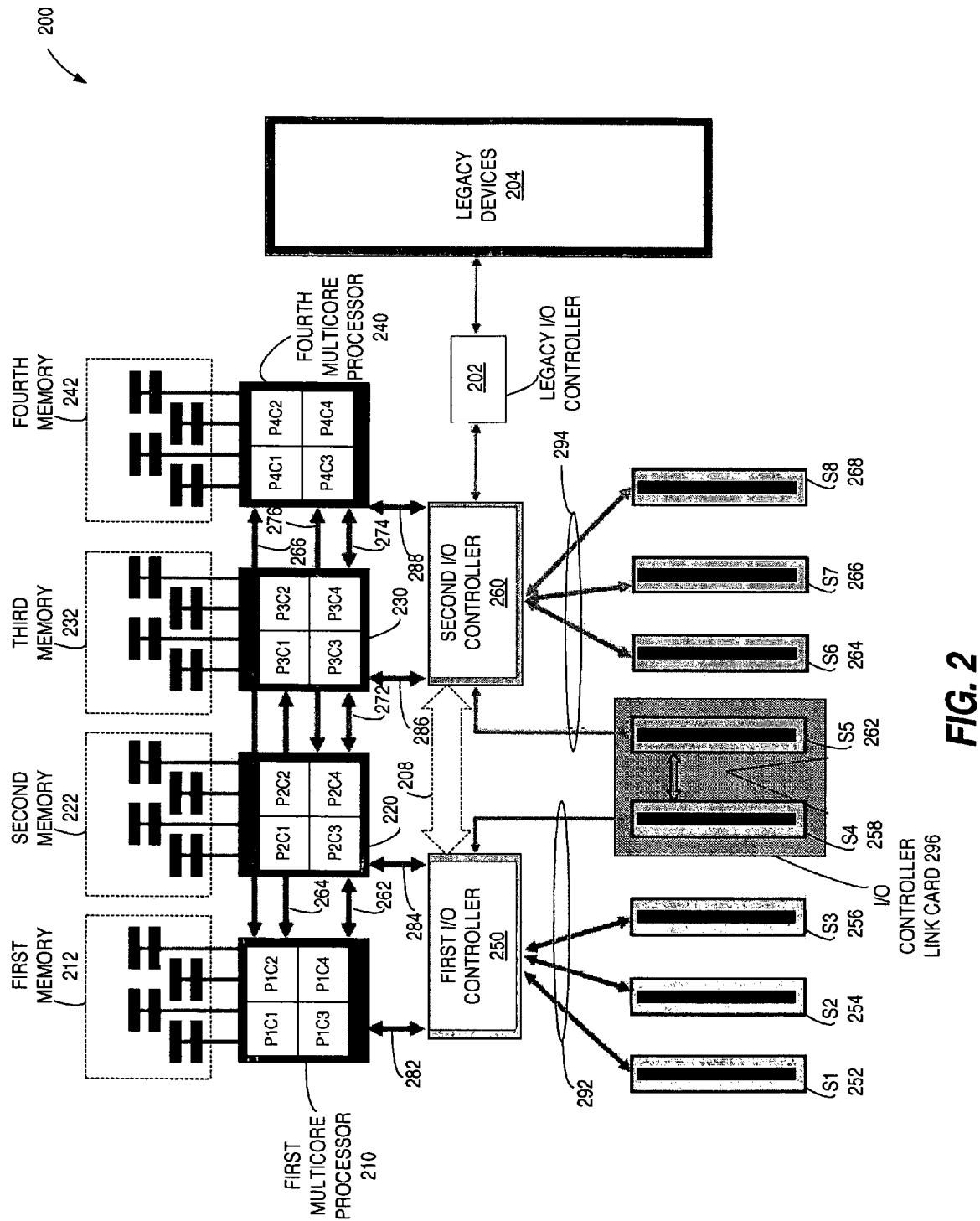
FIG. 2 illustrates an architectural block diagram of an information handling system having at least one multicore processor, according to an embodiment.

FIG. 2 illustrates an architectural block diagram of an information handling system 200 having at least one multicore processor, according to an embodiment. In the depicted embodiment, the IHS 200 includes a first multicore processor 210, a second multicore processor 220, a third multicore processor 230 and a fourth multicore processor 240. In the depicted embodiment, each one of the multicore processors 210, 220, 230 and 240 is a single IC chip that includes four independently operable cores (shown as P1C1, P1C2, P1C3, P1C4, and similar others). It is contemplated that the number of cores included in the multicore processors 210, 220, 230 and 240 may vary based on application. Each one of the multicore processors 210, 220, 230 and 240 is coupled to a corresponding first memory 212, second memory 222, third memory 232 and fourth memory 242.

In the depicted embodiment, each one of the multicore processors 210, 220, 230 and 240 is coupled to another one of the multicore processors via a corresponding point-to-point link. A link, in general, establishes electrical coupling between the two devices. That is, link_12 262 links the first multicore processor 210 and the second multicore processor 220, link_13 264 links the first multicore processor 210 and the third multicore processor 230 and link_14 266 links the first multicore processor 210 and the fourth multicore processor 240. Similarly link_23 272, link_34 274 and link_24 276 are provided for other interprocessor communication. In a particular embodiment, each one of the point-to-point links 262, 264, 266, 272, 274 and 276 may be implemented as a high speed serial bus.

A first I/O controller 250 is coupled to the first multicore processor 210 via link_p1ioc1 282 and to the second multicore processor 220 via link_p2ioc1 284. A second I/O controller 260 is coupled to the third multicore processor 230 via link_p3ioc2 286 and to the fourth multicore processor 240 via link_p4 ioc2 288. Each one of the first and second I/O controllers 250 and 260 connect various I/O devices to the processor(s) included in the IHS 200. That is, an I/O controller provides electrical coupling between various I/O devices and processor(s), and may be available as a central chipset component. In a particular embodiment, each one of the first and second I/O controllers 250 and 260 respectively control a plurality of primary I/O slots and a plurality of secondary I/O slots. Each one of the I/O slots is operable to house an I/O card such as keyboard I/O.

In the depicted embodiment, each one of the plurality of primary and the secondary I/O slots include 4 PCIe slots. That is, the first I/O controller 250 controls I/O slots S1 252, S2 254, S3 256 and S4 258 via a set of first links 292. Similarly, the second controller 260 controls I/O slots S5 262, S6 264, S7 266 and S8 268 via a set of second links 294. In the depicted embodiment, the second I/O controller is coupled to a legacy I/O controller 202 to interface to legacy PCI devices 204. In the depicted embodiment, the set of first and second links 292 and 294 between the I/O controller and the I/O slots are selected to have a predefined value of 4. However, the predefined value may be changed dependent on selection of a particular chipset. In a particular embodiment, each one of the slots may have a selectable performance achieved through a variable width for the set of the first and second links 292 and 294. For example, link widths of X1, X4, X8, X16 and X32 are supported by the PCIe standard. Each link width may have an associated form factor.

In a particular embodiment, an entry level configuration of the IHS 200 may include only the first multicore processor 210. The number of I/O slots available to single multicore processor based architecture may be increased by coupling the first I/O controller 250 and the second I/O controller via an optional dedicated IOC1-to-IOC2 link 208. However, the dedicated IOC1-to-IOC2 link 208 is configured by a manufacturer of the chip set and/or by the computer system manufacturer. As such, once configured the link may not be reconfigurable or easily modified by a user in a field (non-factory) environment. Thus, deployment of the optional dedicated IOC1-to-IOC2 link 208 permanently utilizes 2 I/O slots. That is, 2 slots out of the 8 slots such as slots S4 258 and S5 262 are permanently unavailable to the user.

In a particular embodiment, a dual processor configuration of the IHS 200 may include the first multicore processor 210 and the third multicore processor 230. In this embodiment, the first I/O controller 250 is coupled to the first multicore processor 210 and the second I/O controller 260 is coupled to the third multicore processor 230. In this embodiment, the two I/O controllers 250 and 260 are not linked via the optional dedicated IOC1-to-IOC2 link 208 in order to maximize the number of I/O slots available to the user to 8. In this configuration, if a boot device such as CD-ROM or a hard disk drive of the IHS 200 is coupled to one of the I/O slots S5 262, S6 264, S7 266 or S8 268, then a failure of the third multicore processor 230 disables the electrical coupling between the first multicore processor 210 and the I/O slots S5 262, S6 264, S7 266 and S8 268 coupled to the second I/O controller 260. Thus, the first multicore processor 210 of the IHS 200 is unable to perform a boot up operation, thereby decreasing the reliability and the I/O accessibility of the system.

In the depicted embodiment, an I/O controller link card 296 links I/O slots S4 258 and S5 262. In this embodiment, the I/O slots S4 258 and S5 262 are adjacently disposed to each another, thereby spanning one of the primary I/O slots and one of the secondary I/O slots. This provides a flexible link to electrically couple the first I/O controller 250 and the second I/O controller 260. In a particular embodiment, the I/O controller link card 296 may be removably inserted into the I/O slots S4 258 and S5 262 in a substantially concurrent manner. That is, the I/O controller link card 296 may be plugged into the slots S4 258 and S5 262 to electrically couple the first I/O controller 250 and the second I/O controller 260 or removed from the slots S4 258 and S5 262 to electrically decouple the first I/O controller 250 and the second I/O controller 260.

Unlike the dedicated IOC1-to-IOC2 link 208, which is factory set, the user is able to insert or remove the I/O controller link card 296 in the field. This enables the user to modify the topology of the IHS 200 to achieve increased flexibility, improved reliability, improved I/O accessibility and lower cost. For example, a user may elect to upgrade the entry level configuration, which includes the first multicore processor 210, by adding the third multicore processor 230. This upgrade may be performed by the user in the field by removing the previously installed I/O controller link card 296 to increase system performance, improve system reliability and increase the number of I/O slots available to the user from 6 to 8. Additional details of the I/O controller link card 296 are described with reference to FIG. 3.

As an additional example of improved reliability, the I/O controller link card 296 flexibly links the two I/O controllers 250 and 260 to modify the topology of the configuration. In this configuration, if a boot device such as CD-ROM or a hard disk drive of the IHS 200 is coupled to one of the I/O slots S5 262, S6 264, S7 266 or S8 268, then a failure of the third multicore processor 230 does not disable the electrical coupling between the first multicore processor 210 and the I/O slots S5 262, S6 264, S7 266 and S8 268. That is, the electrical coupling between the first I/O controller 250 and the second I/O controller 260 continues to be enabled by the I/O controller link card 296 and is independent of the failure status of the third multicore processor 230. The first multicore processor 210 of the IHS 200 is able to perform a boot up operation, thereby increasing the reliability and I/O accessibility of the system.

Figure 3:
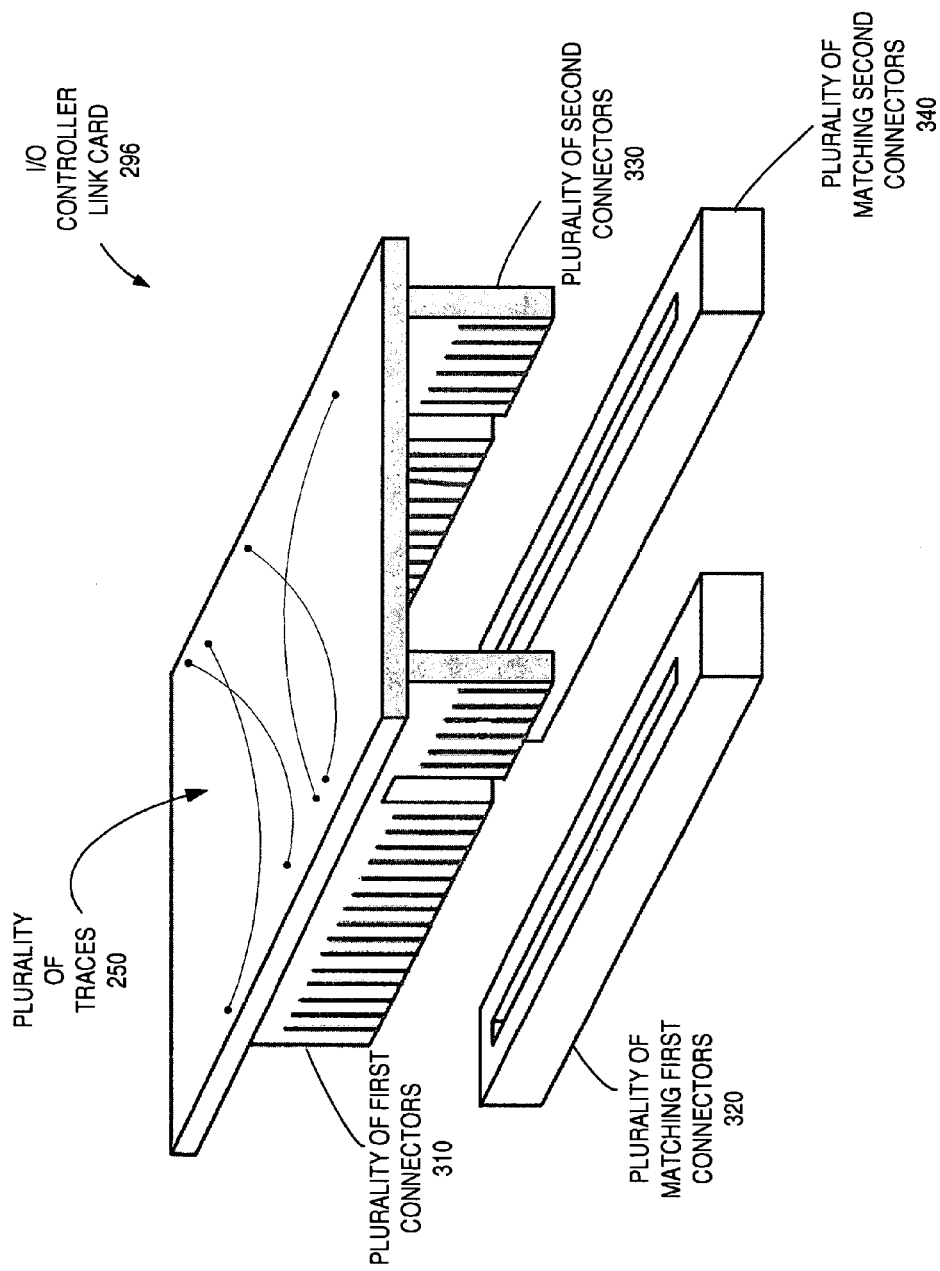
FIG. 3 is a view in perspective illustrating further details of an I/O controller link card described with reference to FIG. 2, according to an embodiment.

FIG. 3 is a view in perspective illustrating further details of the I/O controller link card 296 described with reference to FIG. 2, according to an embodiment. In the depicted embodiment, the I/O controller link card 296 includes a plurality of first connectors 310, a plurality of second connectors 330, and a plurality of traces 350. The plurality of first connectors 310 are removably insertable in a plurality of matching first connectors 320 and a plurality of second connectors 330 are removably insertable in a plurality of matching second connectors 340. The plurality of the matching first connectors 320 are included in a first predefined slot of the primary I/O slots, e.g., slot S4 258 (not shown) of the primary I/O slots. Similarly, the plurality of the matching second connectors 330 are included in a second predefined slot of the secondary I/O slots, e.g., S5 262 (not shown). As described earlier, the first predefined slot and the second predefined slot are adjacently disposed to each other. The plurality of traces 350 electrically couple each connector of the plurality of first connectors 310 to a predefined connector of the plurality of second connectors 330.

When the I/O controller link card 296 is inserted into slots S4 258 and S5 262, at least a portion of the plurality of the matching first connectors 320 are electrically coupled to at least a corresponding portion of the plurality of the matching second connectors 340. Thus, in the inserted position the I/O controller link card 296 enables electrical coupling between the first controller 250 and the second controller 260 via the set of first links 292, the slot S4 258 housing the plurality of the matching first connectors 320, the plurality of the first connectors 310, the plurality of traces 350, the plurality of the second connectors 330, the slot S5 262 housing the plurality of the matching second connectors 340 and the set of second links 294.

Figure 4:
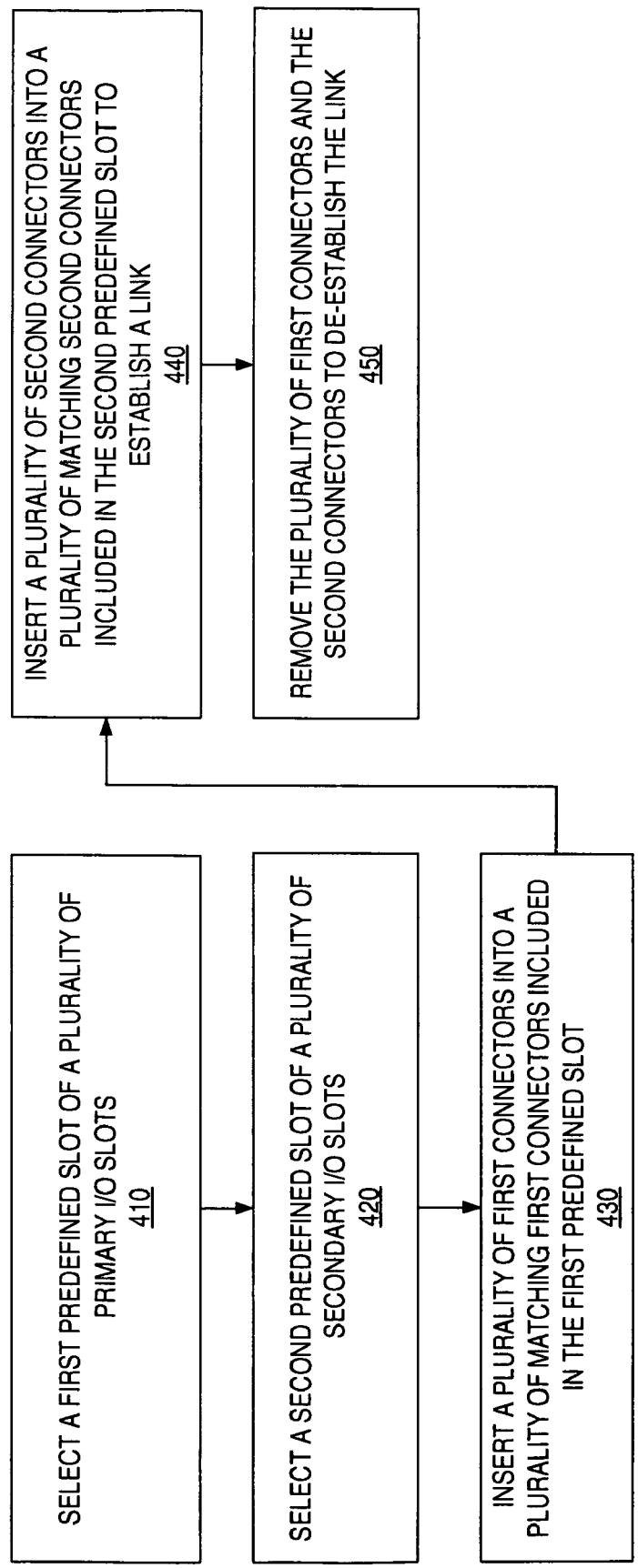
FIG. 4 is a flow chart illustrating a method a method for reconfiguring a link to increase the flexibility, I/O accessibility and reliability of multicore, multiprocessor architecture, according to an embodiment.

FIG. 4 is a flow chart illustrating a method for reconfiguring a link to increase the flexibility, I/O accessibility, and reliability of multicore, multiprocessor architecture, according to an embodiment. In step 410, a first predefined slot, e.g., I/O slot S4 258, of a plurality of primary I/O slots is selected. In step 420, a second predefined slot, e.g., I/O slot S5 262, of a plurality of secondary I/O slots is selected. As described earlier, the first predefined slot and the second predefined slot are adjacently disposed to each other. In step 430, a plurality of first connectors (such as the plurality of the first connectors 310) is inserted into a plurality of matching first connectors (such as the plurality of the matching first connectors 320), with the plurality of the matching first connectors being included in the first predefined slot. In step 440, a plurality of second connectors (such as the plurality of the second connectors 330) is inserted into a plurality of matching second connectors (such as the plurality of the matching second connectors 340), with the plurality of the matching second connectors being included in the second predefined slot. The insertion of the plurality of first connectors and the plurality of second connectors establishes the link. In step 450, the plurality of first connectors and the plurality of second connectors are removed to de-establishes the link.

Various steps described above may be added, omitted, combined, altered, or performed in different orders. In a particular embodiment, the steps 430 and 440 are performed in parallel. That is, the insertion of the plurality of the first connectors and the second connectors occurs in a substantially concurrent manner.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An input/output (I/O) controller link card comprising:
    a plurality of first connectors removably insertable in a plurality of matching first connectors, wherein the plurality of the matching first connectors are located in a first predefined slot of a plurality of primary I/O slots and provide an electrical coupling to a first I/O controller input and a first I/O controller output;
    a plurality of second connectors removably insertable in a plurality of matching second connectors, wherein the plurality of the matching second connectors are located in a second predefined slot of a plurality of secondary I/O slots and provide an electrical coupling to a second I/O controller input and a second I/O controller output, and wherein the first predefined slot and the second predefined slot are adjacently disposed to each other; and
    a plurality of traces electrically coupling each one of the plurality of first connectors to a predefined one of the plurality of second connectors such that the insertion of the plurality of first connectors into the plurality of matching first connectors and the insertion of the plurality of second connectors into the plurality of matching second connectors electrically couples the first I/O controller input to the second I/O controller output and electrically couples the second I/O controller input to the first I/O controller output.

2. The card of claim 1 wherein each one of the primary I/O slots is electrically coupled to a first multicore processor via a first I/O controller, wherein each one of the secondary I/O slots is electrically coupled to a secondary I/O controller, wherein each one of the secondary I/O slots is electrically coupled to the first multicore processor via the first predefined slot, the plurality of traces and the second predefined slot.

3. The card of claim 1, wherein each one of the primary I/O slots is electrically coupled to a first multicore processor via a first I/O controller, wherein each one of the secondary I/O slots is electrically coupled to a second multicore processor via a second I/O controller, wherein the second I/O controller is electrically coupled to the first multicore processor that is independent of a failure status of the second multicore processor.

4. The card of claim 3, wherein a boot up device coupled to one of the secondary I/O slots is electrically coupled to the first multicore processor via the first predefined slot, the plurality of traces and the second predefined slot.

5. The card of claim 3, wherein the first multicore processor is included in an information handling system (IHS).

6. The card of claim 1, wherein the primary I/O slots and the secondary I/O slots are in accordance with a point-to-point serial link interface.

7. The card of claim 6, wherein the plurality of first connectors, the plurality of matching first connectors, the plurality of second connectors and the plurality of matching second connectors are in conformance with a selectable form factor of the point-to-point serial link interface.

8. The card of claim 7, wherein the form factor is selectable from one of X1, X4, X8 and X16 form factors.

9. The card of claim 1, wherein the plurality of first connectors and the plurality of second connectors are respectively inserted into the plurality of matching first connectors and the plurality of matching second connectors in a concurrent manner.

10. The card of claim 1, wherein the first I/O controller and the second I/O controller are electrically decoupled from one another by removal of the plurality of first connectors and the plurality of second connectors respectively from the plurality of matching first connectors and the plurality of matching second connectors.

11. The card of claim 1, wherein the first I/O controller and the second I/O controller are electrically decoupled by a user.

12. A method for reconfiguring a link, the method comprising:
    selecting a first predefined slot of a plurality of primary I/O slots;
    selecting a second predefined slot of a plurality of secondary I/O slots, wherein the first predefined slot and the second predefined slot are adjacently disposed to each other;
    inserting a plurality of first connectors into a plurality of matching first connectors, wherein the plurality of the matching first connectors are located in the first predefined slot and provide an electrical coupling to a first I/O controller input and a first I/O controller output;
    inserting a plurality of second connectors into a plurality of matching second connectors, wherein the plurality of the matching second connectors are located in the second predefined slot and provide an electrical coupling to a second I/O controller input and a second I/O controller output, and wherein insertion of the plurality of first connectors and the plurality of second connectors establishes a link between the first I/O controller input and the second I/O controller output and a link between the second I/O controller input and the first I/O controller output; and
    removing the plurality of first connectors and the plurality of second connectors to de-establish the links.

13. The method of claim 12, wherein the primary I/O slots and the secondary I/O slots are in accordance with a point-to-point serial link interface.

14. The method of claim 13, wherein the plurality of first connectors, the plurality of matching first connectors, the plurality of second connectors and the plurality of matching second connectors are in conformance with a selectable form factor of the point-to-point serial link interface.

15. The method of claim 14, wherein the form factor is selectable from one of X1, X4, X8 and X16 form factors.

16. The method of claim 12, wherein the plurality of first connectors and the plurality of second connectors are respectively inserted into the plurality of matching first connectors and the plurality of matching second connectors in a substantially concurrent manner.

17. An information handling system (IHS) comprising:
- at least one multicore processor;
- a first input/output (I/O) controller coupled to the socket of at least one multicore processor;
- a plurality of primary I/O slots, wherein each one of the plurality of primary I/O slots are coupled to the first I/O controller;
- a second I/O controller coupled to the socket of at least one multicore processor that is not coupled to the first I/O controller;
- a plurality of secondary I/O slots, wherein each one of the plurality of secondary I/O slots are coupled to the second I/O controller; and
- an I/O controller link card to electrically couple the first I/O controller and the second I/O controller, the I/O controller link card including:
  - a plurality of first connectors removably insertable in a plurality of matching first connectors, wherein the plurality of the matching first connectors are located in a first predefined slot of the plurality of primary I/O slots and provide an electrical coupling to a first I/O controller input and a first I/O controller output;
  - a plurality of second connectors removably insertable in a plurality of matching second connectors, wherein the plurality of the matching second connectors are located in a second predefined slot of the plurality of secondary I/O slots and provide an electrical coupling to a second I/O controller input and a second I/O controller output, and wherein the first predefined slot and the second predefined slot are adjacently disposed to each other; and
  - a plurality of traces electrically coupling each one of the plurality of first connectors to a predefined one of the plurality of second connectors such that the insertion of the plurality of first connectors into the plurality of matching first connectors and the insertion of the plurality of second connectors into the plurality of matching second connectors electrically couples the first I/O controller input to the second I/O controller output and electrically couples the second I/O controller input to the first I/O controller output.

18. The system of claim 17, wherein a boot up device coupled to one of the secondary I/O slots is electrically coupled to the first multicore processor via the first predefined slot, the plurality of traces and the second predefined slot.

19. The system of claim 17, wherein the primary I/O slots and the secondary I/O slots are in accordance with a peripheral component interconnect express (PCIe) standard.

* * * * *